Patented Dec. 10, 1946

2,412,312

UNITED STATES PATENT OFFICE 2,412,312

CELLULOSE ACETATE DYED WITH MONOAZO DYES

Christopher Stanley Argyle, Spondon, near Derby, England, assignor to British Celanese Limited, London, England, a company of Great Britain No Drawing. Application November 20, 1942, Serial No. 466,325. In Great Britain December 5, 1941

2 Claims. (Cl. 8—50)

This invention relates to improvements in the manufacture of dyes and in the colouration therewith of textile and other materials, and particularly of materials containing filaments of organic esters or ethers of cellulose.

It has now been found that valuable colourations, particularly yellow colourations of good fastness properties can be produced on textile and other materials, especially materials of a cellulose ester or ether, with the aid of aromatic azo compounds which contain at least one nitro group and one etherified phenolic hydroxy group and are free from salt-forming groups. Preferably a mono-azo compound is employed. Again it is of advantage that all the aromatic nuclei in the azo compounds should belong either to the benzene or to the naphthalene series.

The present invention includes the manufacture of the azo compounds, the dyes themselves and compositions containing them together with other substances, e. g. dispersing agents, processes for the colouration of textile and other materials with the dyes and the coloured materials so obtained.

The dyes of the invention contain nitro groups, and most suitable for the dyeing of cellulose esters or ethers are those dyes containing a nitro group and a halogen atom. Other substituents, with the exception of salt-forming groups, can also be present in the aromatic nuclei of the dye, e. g. alkyl, acidylamio or carboxyamide groups. The preferred etherifying radicles are lower alkyl radicles, e. g. methyl, ethyl, or isopropyl. Alternatively the etherifying radicle can be a hydroxy-alkyl radicle. e. g. beta-hydroxyethyl or gamma-chloro-beta-hydroxypropyl. Conveniently the alkoxy group, or where more than one of such groups is present at least one of the alkoxy groups, in the dye is in the ortho or para position to the azo group, especially the latter.

Of special value are the dyes of the general formula: $NO_2 R.N=N.R'.O.alkyl$ wherein R and R' are benzene nuclei, the —O.alkyl group is in the ortho or para position to the azo group and, apart from the nitro and alkoxy group shown, R and R' are free from substituents or are substituted only by alkyl radicles and/or halogen atoms, and the para position to the alkoxy group is occupied either by the azo group or by one of the other substituents. The nitro group can be in ortho-, meta-, or para-position to the azo group.

The dyes of the invention possess very good fastness to light, soap, acids, alkalies and aqueous treatments generally and are resistant to steaming and acid fumes. The lack of alkali sensitivity is particularly noteworthy in those dyes containing an etherified phenolic group in para position to the azo group, since the corresponding dyes containing free phenolic groups are notoriously loose to alkali.

The dyes of the invention are obtainable by etherification of the corresponding phenolic azo compound, examples of suitable etherifying agents being alkyl halides, e. g. methyl or ethyl chloride, or dialkyl sulphates, e. g. dimethyl or diethyl sulphate, in presence of alkali. For the production of dyes in which the etherifying group is a hydroxyalkyl radicle, suitable etherifying agents are alkylene oxides or alkylene halohydrins.

Compounds which can be etherified in accordance with the invention include 4-nitro-4'-hydroxyazobenzene, 3-nitro-3'-chloro-4'-hydroxyazobenzene, 4-nitro-5'-methyl - 2'hydroxyazobenzene, 2-nitro-4'-hydroxyazobenzene, 2-nitro-4-chlor-4'-hydroxyazobenzene, 4-nitro-2'-chloro-4'-hydroxyazobenzene, 4-nitro-3'-methyl-4'-hydroxyazobenzene, 4-chlor-3'-nitro - 4' - hydroxyazobenzene, 4 - nitro - benzeneazo - alpha-naphthol, the amide or ethyl ester of 4-carboxy-3'-nitro-4'-hydroxyazobenzene, para-nitrobenzeneazobenzeneazo-phenol and para-nitro-benzeneazo-benzeneazo-alpha-naphthol.

An alternative method of forming dyes in accordance with the invention is to convert any salt-forming groups in an azo compound containing such groups, together with at least one nitro group and one etherified phenolic hydroxy group, into non-salt forming groups. For example a nitro-amino-azo compound containing an alkoxy group in one of the aromatic nuclei can be acidylated. Such an amino-azo compound is obtainable by coupling a diazotised aromatic nitro-alkoxyamine with an appropriate amine coupling component or by coupling a diazotised aromatic nitro-amine with an appropriate alkoxyamine coupling component. The acidyl group, which must subsequently be introduced into the free amino group is preferably the radicle of a lower fatty acid, e. g. acetyl or propionyl.

Examples of amino-azo compounds which can be acidylated, as described above, are 4-methoxy-2'-nitro-4'-amino-azobenzene, 2-ethoxy-3' - nitro-4'-amino-azobenzene and 4-methoxy-3-nitro-benzene-azo-alpha-naphthylamine.

Again a nitro-alkoxy-azo compound containing a carboxylic group or other acid group can be converted into a dye of the desired type by esterifying the acid group or converting it into an acid amide group, e. g. via the acid chloride.

The new dyes can be applied to cellulose ester or ether materials in the form of aqueous dispersions or solutions in organic solvents. Bath methods may be employed, that is to say methods in which the materials are allowed to absorb the dye from a dispersion or solution of the latter in which they are immersed. When dyeing from an aqueous dispersion it is preferred to use a temperature of 75–85° C. Again mechanical impregnation methods may be used, the materials being impregnated with a solution or suspension of the requisite amount of the dye. To this end padding or printing methods may be utilised. The mechanically impregnated material may then be aged or steamed to cause the dye to enter the cellulose ester or ether material.

The dyes of the present invention have substantive affinity for cellulose esters or ethers but in general substantially no affinity for cellulose or animal fibres. If, therefore, such a dye is applied to mixed materials containing both cellulose, e. g. cotton or regenerated cellulose, and a cellulose ester or ether, the latter alone takes up the dye and the cellulose component of the material remains uncoloured. By suitably colouring the cellulose component of such mixed material with dyestuffs resisting the cellulose ester or ether component of the materials solid shades or two colour effects can readily be obtained according to the components and dyes selected. The dyestuffs for the cellulose portion can be applied before or after the application of the dye for the cellulose ester or ether portion.

The new dyes are also of value for colouring cellulose ester or ether solutions, especially lacquers and spinning solutions. By shaping and setting such solutions in the form of filaments, straws, films and the like, valuable coloured products can be produced. For example, coloured cellulose acetate filaments can be produced by dry spinning such coloured solutions. In this connection it is of considerable advantage that many of the dyes of the invention, for example 4-chlor-2-nitro-4'-ethoxyazobenzene, possess good solubility in acetone and hence can be actually dissolved as opposed to merely dispersed in spinning solutions of cellulose acetate in acetone.

The invention, so far as it relates to the colouration of materials, is particularly concerned with the production of coloured cellulose acetate products. The new dyes, may, however, also be used for the production of coloured products of other cellulose esters, for example, cellulose formate, propionate, butyrate or acetate-butyrate or of cellulose ethers, for example methyl, ethyl or benzyl cellulose. Further the new dyes can be used for the colouration of materials formed from synthetic linear polymers, for example, superpolyamide filaments or filaments of polymerised vinyl compounds, e. g. filaments of a co-polymer of vinyl acetate with vinyl chloride.

The invention is illustrated by the following examples:

Example I 172 parts by weight of 4-chlor-2-nitro-aniline are dissolved by warming in a mixture of 327 parts of hydrochloric acid (32° Tw.) and 655 parts of water. The solution is then poured on to 1300 parts of crushed ice and diazotisation effected by addition of 72 parts of sodium nitrite dissolved in 500 parts of water. On completion of the diazotisation excess nitrous acid is destroyed by addition of sulphamic acid, and the solution filtered. The clear solution is then run into an alkaline solution containing the following:

|  | Parts |
|---|---|
| Phenol | 94 |
| 10% caustic soda solution | 400 |
| 10% soda ash solution | 2,000 |

When the coupling is completed the whole is neutralised with acetic acid, filtered, washed and dried.

278 parts of the finely powdered 4-chlor-2-nitro-4'-hydroxy azobenzene so obtained are then added to 1100 parts of diethyl sulphate with good stirring at 40° C. The temperature is then raised to 50–55° C. and 110 parts of powdered potassium hydroxide slowly added. The mixture finally thickens and becomes difficult to stir. Thereupon it is diluted with 2500 parts of water containing 50 parts of potassium hydroxide and the whole boiled to decompose excess diethylsulphate. The product is then filtered off washed until free from alkali and dried. Dyed on to cellulose acetate it gives yellow shades of very good fastness to washing and light.

Example II 10 parts of a finely milled aqueous paste of 4-chlor - 2 - nitro - 4'-ethoxy-azobenzene of 10% strength are dispersed in the normal manner by heating with 3 parts of Turkey red oil and diluting with boiling 0.25% soap solution, and then adding to more 0.25 gm. p. l. soap solution sufficient to make 4000 parts.

100 parts of cellulose acetate fabric are now introduced and the temperature raised to 70–80° C. at which temperature the material is processed for 1½ hours. The goods are then washed off, hydroextracted and dried. The shade thus obtained is a bright yellow of good fastness to light, and to washing and similar alkaline treatments.

Example III 168 parts of 4-methoxy-3-nitro-aniline are dissolved by bringing to the boil with 330 parts of hydrochloric acid (32° Tw.) and 660 parts of water. When solution is complete it is poured on to 1300 parts of crushed ice and diazotised by running in slowly, with good stirring, a solution of 72 parts of sodium nitrite dissolved in 500 parts of water. This is then coupled by running into a solution of alpha-naphthylamine hydrochloride previously prepared as follows: 143 parts of alpha-naphthylamine are dissolved by adding to a solution of 200 parts of hydrochloric acid (32° Tw.) and 2000 parts of water, the whole then being brought to the boil. After cooling the solution is poured on to 5000 parts of crushed ice. The diazo solution is then run in with stirring, a solution of sodium acetate is also added in a fine stream to facilitate the coupling by removing the mineral acid. Coupling takes place rapidly but the whole is stirred for 30 minutes to ensure completion. The solid is filtered off washed and dried.

100 parts of the above product are dissolved in 250 parts of glacial acetic acid and 250 parts of acetic anhydride and refluxed for 3 hours. On cooling the 4-methoxy-3-nitro-4'-acetylamino-1:1'-benzene-azo-naphthalene crystallises out and is then filtered off washed and dried. The compound dyed on cellulose acetate gives yellow shades of good fastness to light and to washing in alkaline media.

Having described my invention what I desire to secure by Letters Patent is:

1. Cellulose acetate materials colored with a 4-chlor-2-nitro-4'-alkoxy-azobenzene free from salt-forming groups.

2. Cellulose acetate materials colored with 4-chlor-2-nitro-4'-ethoxy-azobenzene.

CHRISTOPHER STANLEY ARGYLE.